Oct. 30, 1934.                F. P. BINGMAN                 1,979,138
                            PNEUMATIC CONVEYER
                            Filed Feb. 23, 1932
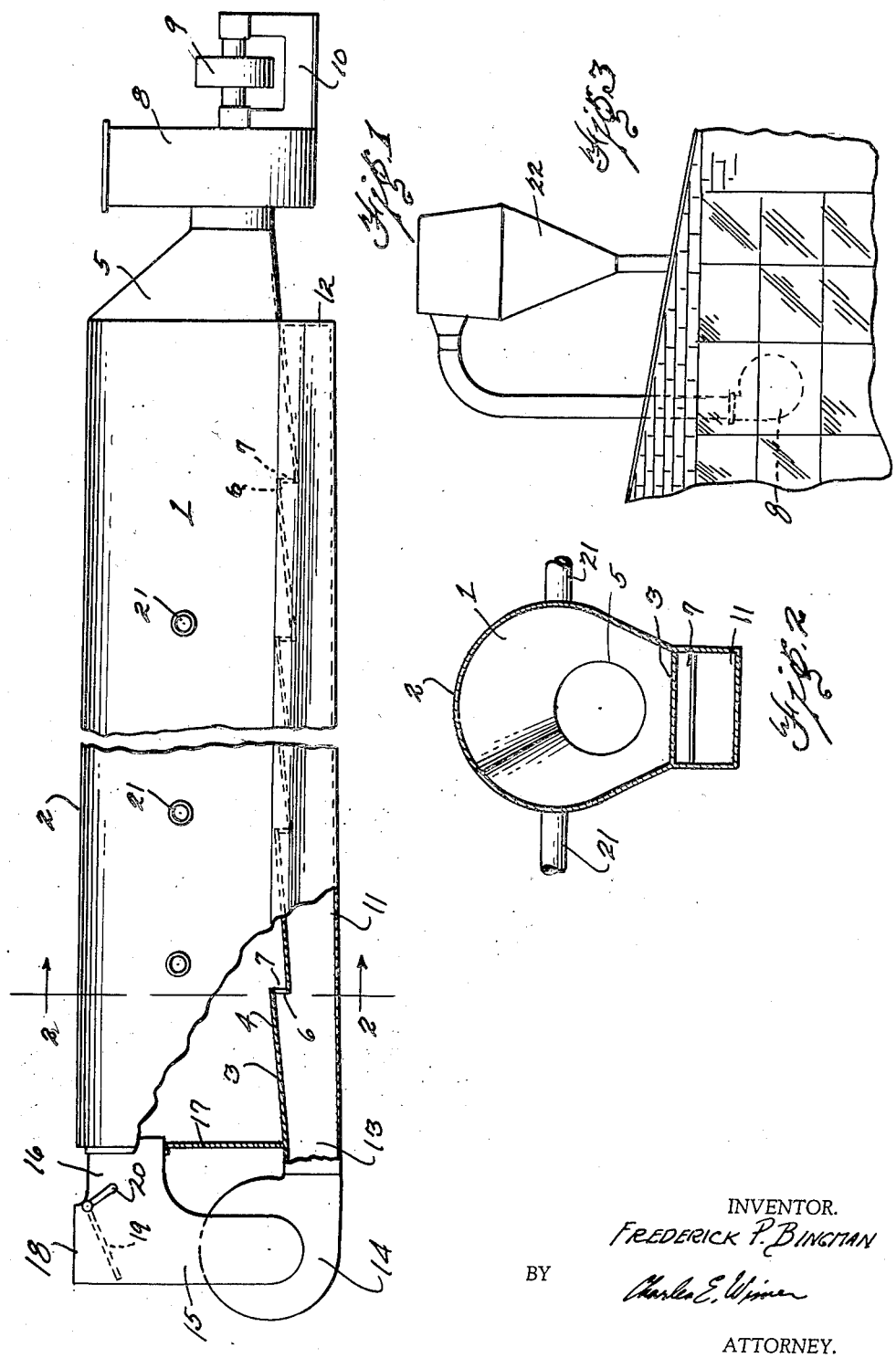
INVENTOR.
FREDERICK P. BINGMAN
BY
Charles E. Wimer
ATTORNEY.

Patented Oct. 30, 1934

1,979,138

UNITED STATES PATENT OFFICE 1,979,138

PNEUMATIC CONVEYER

Frederick P. Bingman, Birmingham, Mich., assignor to The R. C. Mahon Company, Detroit, Mich., a corporation of Michigan Application February 23, 1932, Serial No. 594,413

4 Claims. (Cl. 302—31)

This invention relates to pneumatic conveyers, and the principal feature and object of the invention resides in the provision of a main conduit and an auxiliary conduit having openings into the base of the main conduit in spaced relation longitudinally thereof in conjunction with means for taking air either from the main conduit or from atmosphere or both to discharge through the said openings from the auxiliary conduit to the main conduit whereby the speed of air flow into the main conduit through the said openings may be maintained substantially constant or may be varied to suit variations in operating conditions arising by reason of the addition of branch conduits carrying waste material into the main conduit above the said base or due to cessation of use of numbers of branch conduits for comparatively short periods of time.

It has heretofore been known to provide openings in the base of a main conduit through which air is delivered to the main conduit through operation of an exhaust fan operating to reduce the pressure within the main conduit and it has also been known to utilize an auxiliary fan having an inlet connected to the main conduit and its outlet discharging to the auxiliary conduit and thence to discharge through the said openings or even to take air directly from atmosphere and discharge the same as by means of a fan to the auxiliary conduit. Neither of these prior arrangements have sufficient flexibility to compensate for the varying operating conditions above mentioned. My invention seeks to provide a means of such character as to compensate for the varied operating conditions through increase or decrease of the number of branch conduits for waste material discharging into the main conduit and this is accomplished by my new construction in which the velocity of the air flowing through the openings in the base of the main conduit is in a direction toward the exhaust fan and provides a stream of high speed air along the bottom of the conduit onto which the material from the branch conduits falls and is "hopped" along the base of the main conduit by the successive propelling impulses of the successive air streams. For the sake of efficiency in operation, it is desirable to maintain the velocity of this high speed air stream practically constant under varied operating conditions or to vary the speed thereof to suit the conditions. This feature of applicant's invention is of its greatest value wherein an exhaust fan is of certain specific capacity and is operated practically at constant speed under which condition variation of flow into the main conduit from the branch conduits carrying the waste material and air tends to vary the operating condition or pressures within the conduit.

Another object of the invention resides in the provision of a device of this character which is economical and efficient in operation and which will attain the objects heretofore set up.

These objects and the several novel features of the invention are hereinafter more fully described and claimed and the preferred form of construction by which these objects are attained is shown in the accompanying drawing in which—

Fig. 1 is a side elevational view, partly in section, of my improved conveyer.

Fig. 2 is a section taken on line 2—2 of Fig. 1.

Fig. 3 is an elevational diagrammatic view of the blower and collector connected together.

Referring to the drawing, the conduit 1 is substantially the same in cross sectional area throughout its length and is formed with the upper rounded end 2 and the base 3 which is formed with the portions 4 sloping upwardly toward the outlet end 5 of the conduit, and the vertically extending portions 6 each of which is formed with an aperture 7. A suction fan 8 or blower is connected to the outlet end 5 of the conduit and is suitably driven such as by rotation of the pulley 9 carried by the bracket 10. A conduit 11 is positioned below the conduit 1 and encloses the base 3 thereof, and the end 12 of the conduit adjacent the outlet end 5 of the conduit 1 is closed while the end 13 opens to the discharge end of the compressor fan 14 the same being driven in some suitable manner (not shown). The inlet conduit 15 to the fan 14 opens at 16 through the end wall 17 of the conduit 1 and adjacent the top edge thereof. The inlet conduit 15 is further provided with the end 18 open to atmosphere, the same normally being closed by means of the damper or valve 19 controlled by the handle 20.

The valve 19 is of such character as to shut off communication between the compressor fan 14 and the conduit 1 when the valve is moved to a position approximately vertical and thereby permit communication between outside atmosphere and the fan 14. The pipes or conduits 21 open at one end to the conduit 1 at some point above the base thereof and the opposite ends (not shown) may be connected to the hood of a grinding machine, wood working machine or the like to remove the foreign material from around the machine. It will, of course, be understood that the conduits may be connected to any desired point to remove any of the various types of material to the conduit 1.

The device operates in the following manner: the fans 8 and 14 are set in motion and the fan 8 will pull a partial vacuum in the conduit 1 and will draw air and material through the pipes 21 into the conduit 1 and a portion of the lighter material will be drawn into the fan 8 and discharged therefrom into the collector 22 of any desired construction. The balance of the material will fall to the bottom of the conduit and since the compressor fan 14 draws a certain amount of air from the conduit 1 then compresses the air slightly above atmospheric pressure and discharges the same into the conduit 11 the air under pressure will be discharged through the openings 7 and will move the material on the bottom of the conduit at a relatively fast rate of speed toward the outlet end 5 whereupon the material will be drawn into the fan 8 and discharged therefrom to the collector 22.

It will be seen that the number of pipes 21 may be increased or decreased without impairing the efficiency of operation of the device. In the event that any of the apertures 7 or the conduit 11 become clogged, it is only necessary to move the valve 19 downwardly to cut off communication between the conduit 1 and the fan 14 whereupon air will be drawn through the opening 18 at atmospheric pressure and will be discharged into the conduit 11 at a pressure greater than when air is taken from the conduit 1 by an amount equal to the difference in pressure in the conduit 1 and atmospheric pressure and will remove any foreign material from the openings 7 of the conduit 11. This additional pressure in the conduit 11 is due to the fact that the compressor fan 14 takes air from the conduit 1 at a negative static pressure and raises the air to a positive static pressure. When the air is taken from the outside atmosphere it is unnecessary to raise the pressure of the air to atmospheric pressure and the fan 14 will consequently deliver air to the conduit 11 at a higher pressure than when the air is taken from the conduit 1. By reason of the intake conduit 15 for the blower 14 having an intake opening directly to the main conduit, an opening to atmosphere, and the pressure in the conduit 11 may also be varied by merely varying the position of the valve 19 which may be set at any point from a position closing the intake conduit 15 to the main conduit or between such position and a position closing the conduit 15 to atmosphere.

It will be understood that a certain amount of back pressure will be set up in the collector 22 against which the fan 8 must work but inasmuch as the fan 8 is only required to handle the air delivered to the conduit 1 through the discharge pipes 21 the horsepower required to operate the fan 8 will be considerably less than would be required were the apertures 7 open direct to outside atmosphere and likewise the back pressure in the collector 22 against which the fan 8 is required to work, will be considerably less. It will be further noted that the speed of movement of the material along the base 3 is not governed by the velocity of air in the entire conduit 1 but is governed in its movement toward the discharge end 5 of the conduit by the differential in pressure between the conduits 1 and 11 so that the fan 8 may be relatively small compared to that used for the ordinary type of pneumatic conveyer.

From the foregoing description it becomes evident that I have provided a pneumatic conveyer which is inexpensive in operation and in which the speed of movement of the material along the base of the conveyer is accelerated in its movement toward the discharge end of the conduit by the differential in pressure between the inside and outside of the conduit and the device is so constructed that all of the air handled by the discharge fan is delivered into the conduit through the discharge pipes.

Having thus fully described my invention, its utility and mode of operation, what I claim and desire to secure by Letters Patent of the United States is—

1. In a pneumatic conveyer, a conduit, the base thereof provided with a plurality of openings, means for delivering air and material into the conduit, means for drawing a partial vacuum on the conduit, a compressor fan having an inlet and an outlet, the inlet connected to the conduit for drawing a portion of the air therefrom, the outlet connected to the openings in the base of the conduit for forcing air therethrough at a pressure greater than that of the pressure in the conduit, whereby the material is kept continuously moving along the base of the conduit, and means in the inlet for preventing communication between the inlet of the fan and the conduit while permitting communication between atmosphere and the inlet of the compressor fan.

2. In a pneumatic conveyer, a conduit, the base thereof provided with a plurality of openings, means for delivering air and material into the conduit at some point above the base thereof, means for drawing a partial vacuum on the conduit, a compressor fan having an inlet and an outlet, the inlet connected to the conduit and having a controllable opening to atmosphere for drawing a portion of the air therefrom, the outlet connected to the opening in the base of the conduit whereby the air is forced through the opening in the base at a pressure greater than that of the pressure in the conduit, whereby the material is kept continuously moving along the base of the conduit.

3. In a pneumatic conveyer, a conduit having its base portion provided with a plurality of openings arranged in successive spaced relation, means for delivering air and material into the conduit to fall onto the base portion, means for drawing a partial vacuum on the conduit, a fan having an inlet provided with an opening to the conduit and to atmosphere, and an outlet connected with the said conduit openings to discharge into the conduit therethrough, and a valve for controlling the fan inlet opening to the conduit and opening to atmosphere movable at will to vary the pressure of air discharged through the openings.

4. In a pneumatic conveyer, a main conduit, a base having a plurality of openings arranged in succession longitudinally of the conduit, a suction fan at one end of the main conduit operable at constant speed to produce a certain reduction of pressure within the conduit, a series of inlet conduits for air and material discharging into the said main conduit above the base, a second suction fan having an intake opening to the end of the conduit opposite that to which the said suction fan is connected and an intake opening to atmosphere and discharging through said openings in the base of the main conduit, and a valve for controlling the said intakes of the second suction fan to increase or decrease the volume of the air taken from the main conduit by the said suction fan whereby variation in the number of conduits for air and material discharging into the conduit may be compensated for and the desired velocity of air flow through the said openings in the base of the conduit maintained under varying conditions.

FREDERICK P. BINGMAN.